Aug. 6, 1935.  P. A. DUBUS  2,010,752

BEARING FOR COFFEE ROASTERS

Filed April 8, 1935  2 Sheets-Sheet 1

Inventor
Peter A. Dubus.
By Ivan P. Tashof,
Attorney

Aug. 6, 1935.  P. A. DUBUS  2,010,752
BEARING FOR COFFEE ROASTERS
Filed April 8, 1935  2 Sheets-Sheet 2
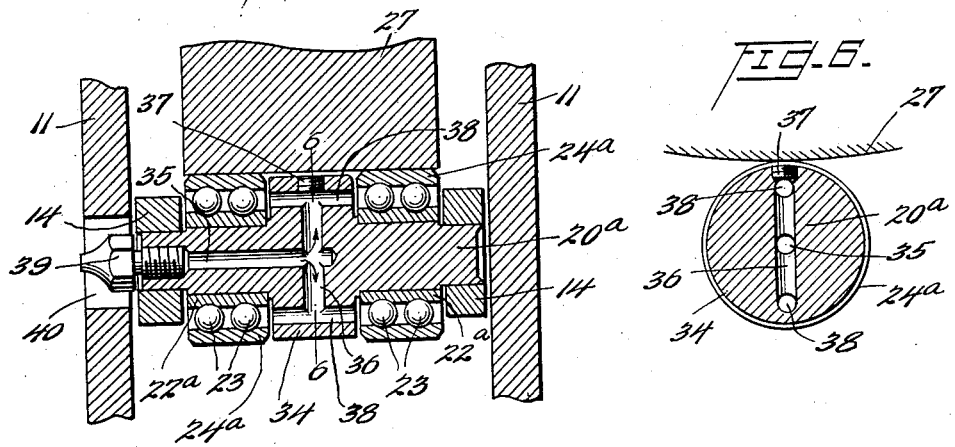
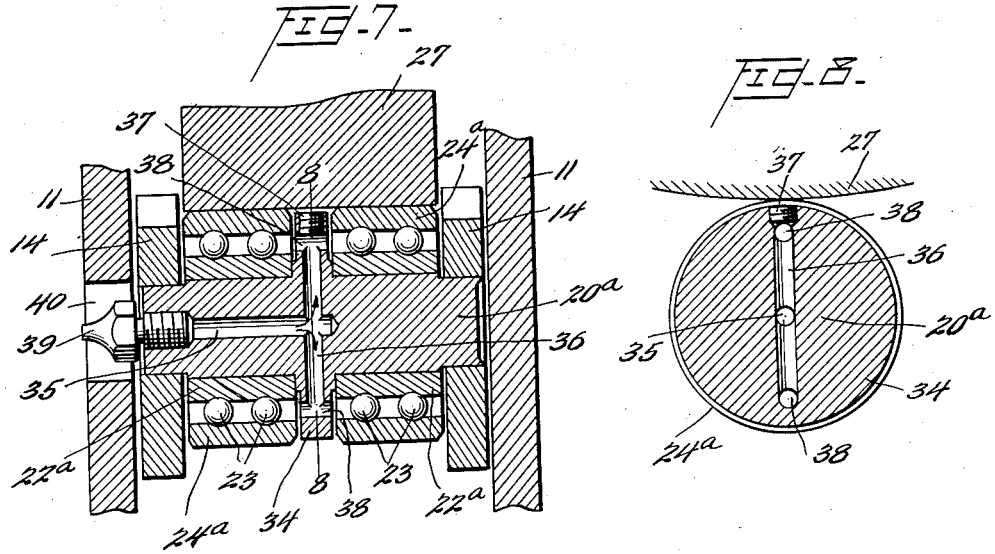
Inventor
Peter A. Dubus,
By Ivan P. Tashof,
Attorney Patented Aug. 6, 1935

2,010,752

UNITED STATES PATENT OFFICE 2,010,752

BEARING FOR COFFEE ROASTERS

Peter A. Dubus, New Orleans, La.

Application April 8, 1935, Serial No. 15,302

16 Claims. (Cl. 308—203)

This invention relates to revolving roasters such as are used for coffee and other commodities and has special reference to the roller bearings which support such devices.

In the roller bearings commonly used for such roasters each consists of a rigid frame supporting a series, generally four, of rollers on axles revoluble in the frame. Certain of these rollers wear more rapidly than the others for various reasons such as supporting more of the weight. It becomes necessary, unless the device is provided with adjusting means for the axles, to replace the cam rollers as otherwise the weight of the revolving cylinder will be carried almost entirely on the remaining rollers.

One object of the invention is to provide an improved form of bearing for rotary coffee roasters and the like whereby adjustment of the rollers may be effected so that each will support the desired portion of weight independently of the diameter of the roller within wide limits.

A second important object of the invention is to provide novel adjusting means for this purpose whereby the rollers may be adjusted at any time, even when the roaster is in operation.

A third important object of the invention is to provide novel adjusting means for such rollers whereby the center of gravity of the roaster cylinder may be brought into symmetrical relation with the points at which it is supported on the rollers.

With the above and other objects in view, the invention consists in general of certain novel details of construction and arrangement of parts hereinafter fully described, illustrated in the accompanying drawings and specifically claimed.

In the accompanying drawings, like characters of reference indicate like parts in the several views, and:

Figure 5 is a section somewhat similar to Figure 4 but showing a different arrangement of ball bearings and also a means of lubricating such bearings.

Figure 6 is a detail section on the line 6—6 of Figure 5.

Figure 7 is a section similar to Figure 5 but showing a modified arrangement of ball bearings and lubricating means.

Figure 8 is a detail section on the line 8—8 of Figure 7.

Figure 1:
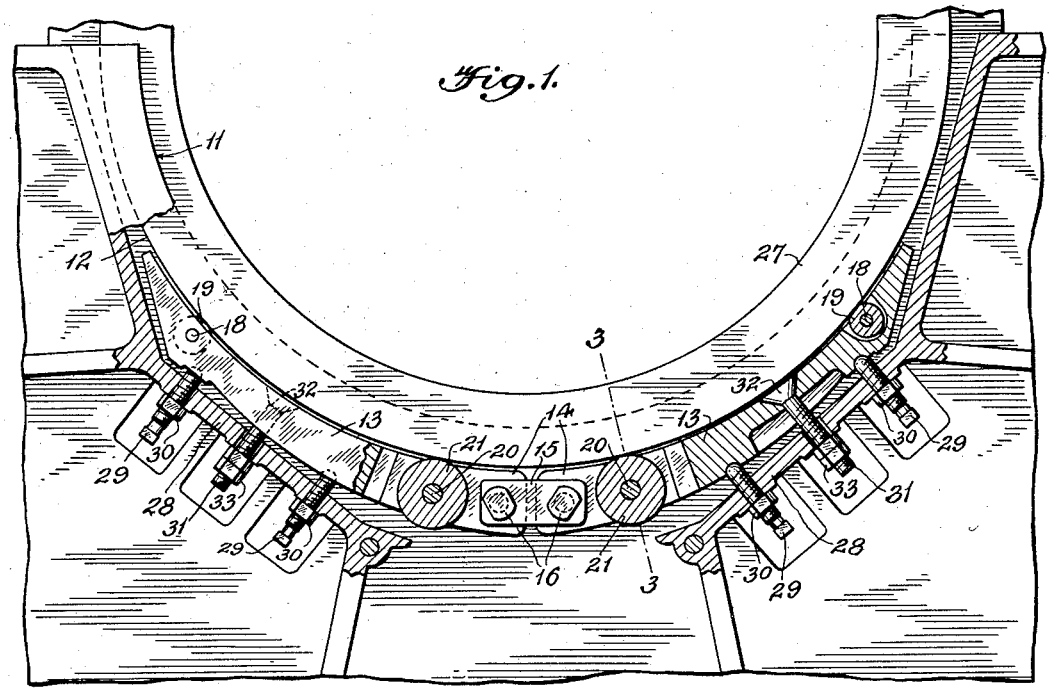
Figure 1 is an end view of a portion of a coffee roaster, the view being partly in elevation and partly in section and showing the upper part of a frame, part of an end journal ring of the roasting cylinder and the roller arrangement.

In the present showing there is disclosed but one of the end bearings for the revolving cylinder of a coffee roaster, and it is to be understood there is a like bearing at the other end of the cylinder.

In the drawings there is shown the upper part of an end frame 10 having the central portion of its upper edge 11 arcuately formed, the arc being approximately a semi-circle. This arcuate portion is channeled as at 12.

Located in the channel at each side of a plane passing vertically through the center of the arc is a shoe having a body 13 and the adjacent ends of the two shoes are slotted to form oppositely disposed pairs of fork arms 14. The fork arms 14 of one shoe are connected to the fork arms of the other by links 15 pivotally secured to the fork arms by bolts 16.

Figure 2:
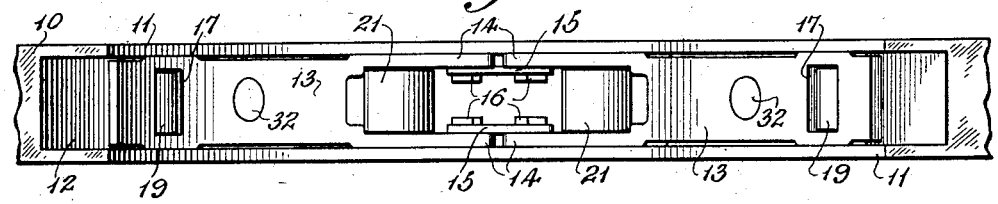
Figure 2 is a plan view of the roller bearings and the part of the frame supporting such bearings.
Figure 3:
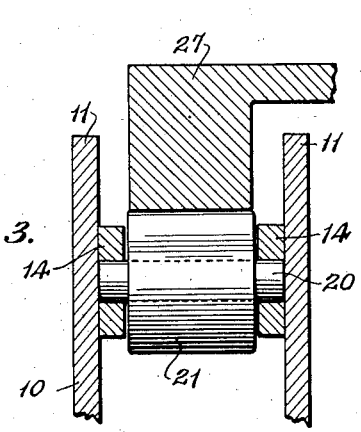
Figure 3 is an enlarged section on the line 3—3 of Figure 1.
Figure 4:
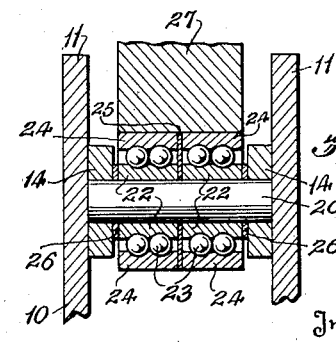
Figure 4 is a similar section but showing a modified form of roller.

Adjacent the opposite end of each shoe there is provided a slot or pocket 17. Across each slot 17 extends a shaft 18 whereon is mounted a roller 19. Between each pair of fork arms 14 extends a shaft 20 and in Figures 1, 2 and 3, this shaft carries a roller 21 of the solid type, while in Figure 4, the shaft carries sleeves 22 forming the inner races of ball bearings having balls 23 and outer races 24. Also in the form shown in Figure 4, two double row bearings are used and these are separated by a washer 25. Also washers 26 are interposed between the inner races 22 and the fork arms 14. In this form the outer races act as supporting rollers.

In the forms of the roller bearing arrangement shown in Figures 5 to 8, there is provided a shaft 20a having a central flange 34, on each side of which is a ball bearing having an inner race 22a separated by the usual balls 23 from an outer race 24a. An oil hole 35 is drilled axially into the shaft from one end thereof to a point slightly beyond the middle of its length and a second oil hole 36 is drilled diametrically of the flange 34 from a point on the middle line of the periphery of the flange to a point close to the opposite part of the flange, the hole thus being closed at one end. This oil hole intersects the oil hole 35 adjacent its inner end and is provided at its open end with a screwed-in closure plug 37. A pair of oil holes 38 are drilled from side to side of the flange in alignment with the centers of the balls 23 and intersecting the oil hole 36. The open end of the oil hole 35 is enlarged and threaded to receive a grease or oil fitting 39 of any suitable form and a slot 40 is provided in the flange 14 at this side of the device so that the fitting may have room for play as the device is adjusted. It is to be understood that the grease fitting 39 here shown is typical of any desired form of fitting for this purpose and it will be obvious that the device may be adapted for use with a grease gun or a lubricator such as a sight feed lubricator as may be desired in the special case. It will be noted that the form shown in Figure 5 is like that shown in Figure 7, except that the flange in Figure 5 is wider than the flange in Figure 7, and the ball bearings are respectively proportioned, those in Figure 5 being narrower.

The four rollers thus arranged form supports or bearings for the journal ring 27 commonly provided on roaster cylinders.

Beneath each shoe the frame is provided with an inclined shoe supporting portion 28. Through each portion 28 is screwed a pair of spaced adjusting bolts 29 bearing against the under side of the respective shoe and there bolts are provided with locking nuts 30. Centrally between each pair of bolts 29 is a holding down bolt 31 having a head 32 countersunk into the upper face of the respective shoe. The bolts 31 pass loosely through the portions 28 and are each provided with double nuts 33 below the portions 28.

In use the greater part of the weight of the roaster cylinder is borne by the rollers 21 while the rollers 19 support a portion of the direct weight and resist any side thrusts developed during rotation of the cylinder. It will be plain that, on each side of the device a proper adjustment of the bolts 29 will effect desired distribution of weight between the rollers 19 and 21 of that side. Also the weight may be distributed properly between the two shoes by bodily raising or lowering one of the shoes with respect to the other. The shoes are thus both tiltably and bodily adjustable.

There has thus been provided a simple and efficient device of the kind described and for the purpose specified.

It is obvious that changes may be made in the forms and construction of the invention without departing from the principles involved in its construction. It is not, therefore, desired to limit the invention to the exact form herein shown and described, but it is desired to include all forms which come within the scope of the appended claims.

What is claimed is:—

1. In a bearing for the journal rings of rotating cylinders, a frame, a pair of shoes mounted at opposite sides of said frame, each shoe being arranged for tilting movement with respect to said frame, rollers carried by each shoe adjacent its ends and adjustable rigid supports carried by the frame for each shoe and supporting the opposite ends of each shoe.

2. In a bearing for the journal rings of rotating cylinders, a frame having a channel formed in its upper edge of general arcuate form, a pair of arcuate shoes movably fitted in said channel at opposite sides of the center of its length, rollers carried by each shoe adjacent its ends, and adjustable rigid supports carried by the frame adjacent each end of each shoe and engaging the shoes to effect tilting of said shoes.

3. In a bearing for the journal rings of rotating cylinders, a frame having a channel formed in its upper edge of general arcuate form, a pair of arcuate shoes movably fitted in said channel at opposite sides of the center of its length, rollers carried by each shoe adjacent its ends, adjustable rigid supports carried by the frame adjacent each end of each shoes and engaging the shoes to effect tilting of said shoes, and bodily movement of the shoes toward and from the bottom of the channel.

4. In a bearing for the journal rings of rotating cylinders, a frame having a channel formed in its upper edge of general arcuate form, a pair of arcuate shoes movably fitted in said channel at opposite sides of the center of its length, rollers carried by each shoe adjacent its ends, adjusting bolts extending through the bottom of the channel and engaging the shoes near their respective ends to space the ends adjustably from the bottom of the channel.

5. In a bearing for the journal rings of roaster cylinders, a frame, a pair of shoes mounted at opposite sides of said frame, each shoe being arranged for tilting movement with respect to said frame, rollers carried by each shoe adjacent its ends, adjusting means supporting the opposite ends of each shoe, other means between the adjusting means of each shoe and arranged to adjustably limit the movement of the shoe by the first adjusting means.

6. In a bearing for the journal rings of roaster cylinders, a frame having a channel formed in its upper edge of general arcuate form, a pair of arcuate shoes movably fitted in said channel at opposite sides of the center of its length, rollers carried by each shoe adjacent its ends, and adjusting means carried by the frame adjacent each end of each shoe and engaging the shoes to effect tilting of said shoes, other means between the adjusting means of each shoe and arranged to adjustably limit the movement of the shoe by the first adjusting means.

7. In a bearing for the journal rings of roaster cylinders, a frame having a channel formed in its upper edge of general arcuate form, a pair of arcuate shoes movably fitted in said channel at opposite sides of the center of its length, rollers carried by each shoe adjacent its ends, adjusting means carried by the frame adjacent each end of each shoe and engaging the shoes to effect tilting of said shoes, bodily movement of the shoes toward and from the bottom of the channel, other means between the adjusting means of each shoe and arranged to adjustably limit the movement of the shoe by the first adjusting means.

8. In a bearing for the journal rings of roaster cylinders, a frame having a channel formed in its upper edge of general arcuate form, a pair of arcuate shoes movably fitted in said channel at opposite sides of the center of its length, rollers carried by each shoe adjacent its ends, adjusting bolts extending through the bottom of the channel and engaging the shoes near their respective ends to space the ends adjustably from the bottom of the channel, a holding down bolt extending through the bottom of the channel between the adjusting bolts of each shoe and engaging said shoe.

9. In a bearing for the journal rings of roaster cylinders, a frame, a pair of shoes mounted at opposite sides of said frame, each shoe being arranged for tilting movement with respect to said frame, rollers carried by each shoe adjacent its ends, adjusting means supporting the opposite ends of each shoe, other means between the adjusting means of each shoe and arranged to adjustably limit the movement of the shoe by the first adjusting means, and links connecting the adjacent ends of said shoes and having their ends pivoted to the shoes.

10. In a bearing for the journal rings of roaster cylinders, a frame having a channel formed in its upper edge of general arcuate form, a pair of arcuate shoes movably fitted in said channel at opposite sides of the center of its length, rollers carried by each shoe adjacent its ends, adjusting means carried by the frame adjacent each end of each shoe and engaging the shoes to effect tilting of said shoes, other means between the adjusting means of each shoe and arranged to adjustably limit the movement of the shoe by the first adjusting means, and links connecting the adjacent ends of said shoes and having their ends pivoted to the shoes.

11. In a bearing for the journal rings of roaster cylinders, a frame having a channel formed in its upper edge of general arcuate form, a pair of arcuate shoes movably fitted in said channel at opposite sides of the center of its length, rollers carried by each shoe adjacent its ends, adjusting means carried by the frame adjacent each end of each shoe and engaging the shoes to effect tilting of said shoes, bodily movement of the shoes toward and from the bottom of the channel, other means between the adjusting means of each shoe and arranged to adjustably limit the movement of the shoe by the first adjusting means, and links connecting the adjacent ends of said shoes and having their ends pivoted to the shoes.

12. In a bearing for the journal rings of roaster cylinders, a frame having a channel formed in its upper edge of general arcuate form, a pair of arcuate shoes movably fitted in said channel at opposite sides of the center of its length, rollers carried by each shoe adjacent its ends, adjusting bolts extending through the bottom of the channel and engaging the shoes near their respective ends to space the ends adjustably from the bottom of the channel, a holding down bolt extending through the bottom of the channel between the adjusting bolts of each shoe and engaging said shoe, and links connecting the adjacent ends of said shoes and having their ends pivoted to the shoes.

13. In a bearing for the journal rings of rotating cylinders, a frame, a pair of shoes mounted at opposite sides of said frame, each shoe being arranged for tilting movement with respect to said frame, rollers carried by each shoe adjacent its ends and adjusting means supporting the opposite ends of each shoe, means to limit the action of the adjusting means, and means to connect the adjacent ends of the shoes to permit adjustment of one shoe independently of the other.

14. In a bearing for the journal rings of rotating cylinders, a frame having a channel in its upper edge, a pair of shoes tiltably mounted in said channel, a shaft carried by each shoe, ball bearings mounted on said shafts, and a lubricator fitting carried by the end of each shaft, said channel being slotted to provide space for movement of said fittings, said shafts having lubricating passages leading from the fitting to points opposite the ball spaces of said ball bearings.

15. A bearing device including a support, a shaft having its ends mounted in said support, and provided intermediate its ends with a peripheral flange, said shaft having an axial oil hole extending from one end of the shaft to substantially the middle of the flange, said shaft having a second oil hole extending radially from a point on the periphery of said flange and intersecting the first oil hole, and a ball bearing having an inner race, an outer race and balls separating the races, said bearing having its inner race mounted on the shaft against said flange, said flange having an oil hole extending from the face adjacent said bearing and intersecting the second oil hole.

16. A bearing device including a support, a shaft having its ends mounted in said support, said shaft having a peripheral flange intermediate of its length, said shaft having an axial oil hole extending from one end to a point opposite the flange, said shaft having a second oil hole extending radially from the periphery of the flange to intersect the first oil hole and having a third oil hole extending through the flange from side to side, and a pair of ball bearings each having an inner race, an outer race and balls between the inner and outer race, said ball bearings being arranged on opposite sides of the said flange with the third oil hole aligned with the spaces between said races.

PETER A. DUBUS.